US010165072B2

(12) United States Patent
Falkenburg et al.

(10) Patent No.: US 10,165,072 B2
(45) Date of Patent: *Dec. 25, 2018

(54) UNIFIED TRACKING DATA MANAGEMENT

(71) Applicant: Apple Inc., Cupertino, CA (US)

(72) Inventors: Steven Jon Falkenburg, Los Altos, CA (US); Darin Benjamin Adler, Los Gatos, CA (US); Jessie Leah Berlin, Santa Clara, CA (US); Jing Jin, Sunnyvale, CA (US); Kevin W. Decker, San Jose, CA (US); Maciej Stachowiak, San Francisco, CA (US)

(73) Assignee: APPLE INC., Cupertino, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/005,769

(22) Filed: Jan. 25, 2016

(65) Prior Publication Data

US 2016/0142504 A1 May 19, 2016

Related U.S. Application Data

(63) Continuation of application No. 14/315,181, filed on Jun. 25, 2014, now Pat. No. 9,247,016, which is a
(Continued)

(51) Int. Cl.
*H04L 29/08* (2006.01)
*G06F 17/30* (2006.01)
(Continued)

(52) U.S. Cl.
CPC ........ *H04L 67/22* (2013.01); *G06F 17/30876* (2013.01); *G06F 21/552* (2013.01);
(Continued)

(58) Field of Classification Search
CPC ....... H04L 67/22; H04L 63/104; H04L 67/02; G06F 21/552
(Continued)

(56) References Cited

U.S. PATENT DOCUMENTS 5,708,811 A 1/1998 Arendt et al.
6,112,238 A 8/2000 Boyd et al.
(Continued)

OTHER PUBLICATIONS

Abad et al., "An Analysis on the Schemes for Detecting and Preventing ARP Cache Poisoning Attacks," Distributed Computing Systems Workshops, 2007, ICDCSW '07. 27th International Conference on Year: 2007, 8 pages.
(Continued)

*Primary Examiner* — Eleni A Shiferaw
*Assistant Examiner* — Angela R Holmes
(74) *Attorney, Agent, or Firm* — Morgan, Lewis & Bockius LLP

(57) ABSTRACT

Methods and apparatuses that collect tracking data items into a plurality of data stores for one or more domain in response to resources received from the domains are described. Each tracking data item may be accessible for one of the domains. Relationships of the domains may be identified among the tracking data items across multiple data stores according to the resources received. One or more of the domains may be selected according to the identified relationships to control accessibility of the tracking data items for the domains. The data stores may be updated to prohibit accessing at least a portion of the tracking data items for the selected domains.

21 Claims, 10 Drawing Sheets

Related U.S. Application Data continuation of application No. 13/093,767, filed on Apr. 25, 2011, now Pat. No. 8,793,809.

(51) Int. Cl.
*G06F 21/55* (2013.01)
*H04W 12/02* (2009.01)
*H04L 29/06* (2006.01)
*H04W 4/029* (2018.01)
*G06F 11/30* (2006.01)
*G06F 11/34* (2006.01)
*H04L 12/26* (2006.01)

(52) U.S. Cl.
CPC ............ *H04L 63/104* (2013.01); *H04L 67/02* (2013.01); *H04L 67/146* (2013.01); *H04W 4/029* (2018.02); *H04W 12/02* (2013.01); *G06F 11/30* (2013.01); *G06F 11/34* (2013.01); *G06F 2221/2101* (2013.01); *G06F 2221/2115* (2013.01); *G06F 2221/2119* (2013.01); *H04L 43/00* (2013.01)

(58) Field of Classification Search
USPC .......................................................... 726/30
See application file for complete search history.

(56) References Cited

U.S. PATENT DOCUMENTS

2006/0265495 A1    11/2006   Butler et al.
2011/0191664 A1*    8/2011   Sheleheda ............. G06F 15/173
                                                               715/205

OTHER PUBLICATIONS

Apple AppStore, Safari Cookies 1.6.3, SweetP Productions, Nov. 4, 2010, 10 pages.
Li, Mash-IF: Practical Information-Flow Control Within Client-Side Mashups, 2010 IEEE/IFIP International Conference on Dependable Systems & Networks, 10 pages.
Maxa Research, Maxa-Cookie-Manager-User Manual, SW-Release V5.0, Document Rev. 1.0, Dec. 6, 2011, 23 pages.
NettiCat, Better Privacy 1.49, Mozilla Firefox, Jan. 20, 2012, 6 pages.
PC World Magazine, "Cookie Pal", Kookaburra Software, Jan. 16, 2001, 3 pages.
Yue, "Automatic Cookie Usage Setting With CookiePicker", The College of William and Mary, 37th Annual IEEE/FIP International Conference on Dependable Systems and Networks, Jun. 25, 2007, 10 pages.
Zhang et al., "An Overview of Wireless Intrusion Prevention Systems," Communication Systems, Networks and Application (ICCSNA), 2010 Second International Conference on Year: 2010, vol. 1, 4 pages.
Office Action, dated Aug. 2, 2013, received in U.S. Appl. No. 13/093,767, 29 pages.
Notice of Allowance, dated Mar. 26, 2014, received in U.S. Appl. No. 13/093,767, 17 pages.
Office Action, dated Jun. 10, 2015, received in U.S. Appl. No. 14/315,181, 11 pages.
Notice of Allowance, dated Sep. 14, 2015, received in U.S. Appl. No. 14/315,181, 9 pages.

* cited by examiner

900

In response to receiving a user input via a user interface (e.g. a preference button), collecting descriptions of tracking data stored in each of a plurality of data stores (e.g. locally) in a device, each data store storing a separate type of the tracking data, the descriptions identifying which web sites (or domains) storing tracking data in each data store 901

Merging the collected descriptions across the data stores, the merged descriptions including summary statistics indicating a degree of data tracking on the device 903

Presenting the summary statistics of data tracking with options to allow a user to select counter measures to reduce the degree of data tracking on the device in a unified manner 905

In response to receiving a user selection of the counter measures via the options, updating the data stores for the selected counter measure to reduce the degree of data tracking on the device 907

Fig. 9

UNIFIED TRACKING DATA MANAGEMENT

RELATED APPLICATIONS

This application is a continuation of U.S. patent application Ser. No. 14/315,181, filed Jun. 25, 2014, which is a continuation of U.S. patent application Ser. No. 13/093,767, filed Apr. 25, 2011, now U.S. Pat. No. 8,793,809, both of which are incorporated by reference herein in their entirety.

FIELD OF INVENTION

The present invention relates generally to tracking data from websites. More particularly, this invention relates to a unified manner to expose and manage tracking data from websites.

BACKGROUND

With the increase in the popularity of the web (or World Wide Web), more and more websites are tracking users' browsing activities for legitimate or illegitimate reasons, such as targeted advertisements or privacy theft. Hidden websites may perform usage tracking in the background unknown to a user while the user visits a seemingly unrelated website. As a result, user privacy can be seriously compromised.

Typically, websites rely on local data storage in a device for usage tracking. For example, browser cookie is commonly used as a local storage mechanism for websites to store tracking data. Traditional privacy management tools are largely based on managing commonly used website storage mechanisms such as browser cookies. However, as technologies evolve, the browser continues to support new mechanisms for local storages. Thus, new opportunities for usage tracking are made available for websites to take advantage of. As a result, these traditional privacy management tools may give only a false sense of security without keeping up with the newly introduced mechanisms for usage tracking.

Furthermore, the ever increasing number of third party plugin modules or extensions installed for a browser also contributes to the complexity of managing usage tracking. Usually, these plugins are provided with their own private local storages requiring separate interfaces for external access. Thus, a user may be required to keep track of a constantly changing number of local data stores and/or interfaces for managing usage tracking or removing usage tracking data.

Therefore, existing approaches for managing usage tracking do not provide a user with an option to control usage tracking in a unified, comprehensive and robust manner.

SUMMARY OF THE DESCRIPTION

A unified interface can be provided to identify and manage various parties or websites storing local data with degrees of usage tracking, for example, on a browser application. The interface may include a streamlined presentation to expose all websites or companies that may be tracking a user of a device. For example, a degree of tracking associated with a particular website (or domain) may be indicated by revealing that the particular website has locally stored a variety of types of data which can be used for usage tracking as the browser application visits certain websites. Information on all types of tracking activities targeting a user (or a device) from one single website may be consolidated to reveal possible hidden tracking activities. Counter measures may be provided to allow a user to remove multiple types of tracking data in a single request to minimize the user's management effort.

An embodiment of the present invention includes methods and apparatuses that collect tracking data items into a plurality of data stores for one or more domains in response to resources received from the domains. Each tracking data item may be accessible for one of the domains. Relationships of the domains may be identified among the tracking data items across multiple data stores according to the resources received. One or more of the domains may be selected according to the identified relationships to control accessibility of the tracking data items. The data stores may be updated to prohibit accessing a portion of the tracking data items for the selected domains.

In another embodiment, data items may be stored in one or more data stores according to resources received from a plurality of domains. Each data item may be accessible for one of the domains to allow usage tracking for the domain. Relationships among the domains may be analyzed for one or more statistics of the data items in response to a user request. The statistics may indicate degrees of usage tracking for corresponding domains. The domains may be presented via the user interface in an order sorted according to the degrees of usage tracking.

In yet another embodiment, tracking data items may be stored in one or more data stores locally in a device via resources received from a domain by a browser application. A portion of the tracking data items capable of carrying usage tracking information on the browser application may be identified for the domain. The identified portion of tracking data items may be removed from the data stores to prevent restoration of the usage tracking information in the data stores via future resources received from the domain.

Other features of the present invention will be apparent from the accompanying drawings and from the detailed description that follows.

BRIEF DESCRIPTION OF THE DRAWINGS

The present invention is illustrated by way of example and not limitation in the figures of the accompanying drawings, in which like references indicate similar elements and in which:

FIG. 9 is a flow diagram illustrating one embodiment of a process to present summary statistics on tracking data to manage degrees of tracking in a unified manner;

DETAILED DESCRIPTION

Figure 1:
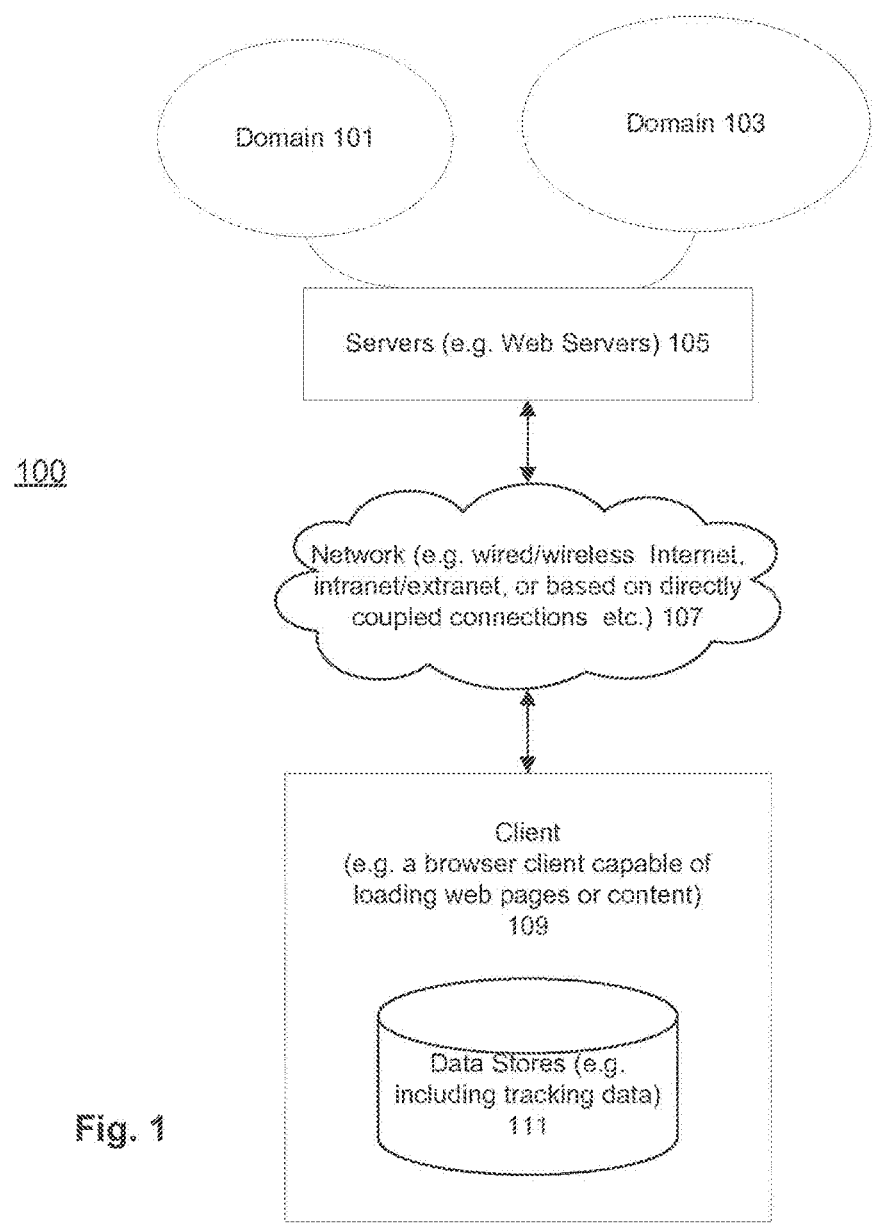
FIG. 1 is a block diagram illustrating one embodiment of network systems with unified tracking data management.

Methods and apparatuses for managing usage tracking are described herein. In the following description, numerous specific details are set forth to provide thorough explanation of embodiments of the present invention. It will be apparent, however, to one skilled in the art, that embodiments of the present invention may be practiced without these specific details. In other instances, well-known components, structures, and techniques have not been shown in detail in order not to obscure the understanding of this description.

Reference in the specification to "one embodiment" or "an embodiment" means that a particular feature, structure, or characteristic described in connection with the embodiment can be included in at least one embodiment of the invention. The appearances of the phrase "in one embodiment" in various places in the specification do not necessarily all refer to the same embodiment.

The processes depicted in the figures that follow, are performed by processing logic that comprises hardware (e.g. circuitry, dedicated logic, etc.), software (such as is run on a general-purpose computer system or a dedicated machine), or a combination of both. Although the processes are described below in terms of some sequential operations, it should be appreciated that some of the operations described may be performed in different order. Moreover, some operations may be performed in parallel rather than sequentially.

In one embodiment, a degree of usage tracking invoked by a website or a remote entity targeting a user (or a device used by the user) may be exposed to allow the user to exercise control over the tracking. For example, the website (or domain) may collect user information via tracking data locally stored in the device as the user uses an application, such as a browser, which may access or make connections to the website. Counter measures may be provided for the user to control the degree of usage tracking allowed for the website. In certain embodiments, the degree of usage tracking may be based on local data stored (or synchronized) within multiple devices, such as IPad®, IPhone®, Macintosh®, or other devices.

A website may be revealed with a degree of potential tracking activities intended from the website. The degree of usage tracking may correspond to a variety of information collected and/or analyzed from locally stored data and/or records in a device hosting an application such as a browser. For example, the information may indicate which types of data have been stored for the website, how many of different types of data (e.g. breadth of storage) have been stored for the website, how often the website has invoked data tracking (or storage), the amount of data stored for the website, the number of other websites causing the website to indirectly store data items, a history (e.g. how many times, frequency, etc.) of accessing (or visiting) the website as requested by a user, or other applicable measures, etc. The degree of usage tracking may include a scale based an equation or mathematical formula which combines multiple sources of information collected from locally stored data. In one embodiment, the degree of usage tracking associated with a website may represent how aggressive the website has attempted to track a user.

Presentation of degrees of usage tracking may be organized around websites storing data items locally in a device to allow a user to control or manage usage tracking from these websites. For example, the presentation may include descriptions of the websites and/or relationships between the websites in a sorted order for identifying or selecting which websites are most active in usage tracking. Multiple criteria may be applied individually or in combination for the sorting, such as the number of different storage technologies (or types of data) employed and/or the number of other embedding websites in storing the data items. Storage technologies for different types of data may include, for example, cookies, local cache, plug-in local storage, or other applicable technologies. In some embodiments, the sorting may identify a top website which could store tracking data over a high percentage (e.g. 80%) of websites a user has visited.

Descriptions on degrees of usage tracking may show certain tracking patterns uncovered from data items stored locally in a device for a website, such as frequency of data storing activities, depth of embedding (e.g. hyperlinking) relationships with other websites, and/or other applicable evidences or traces of usage tracking. Additional information for the websites discovered with tracking data in a device may be automatically linked to assist usage tracking management, for example, by providing reputation ratings of the websites, filtering the websites with lists (e.g. blacklists) of known trackers, or other applicable third party information.

In one embodiment, counter measures against usage tracking from websites may be provided together with degrees of the usage tracking in a unified manner to allow a user to exercise control over the usage tracking. As a result, the user does not need to perform separate user interface operations for different types of data, different websites, nor different and separate third party programs or management applications. For example, one of the counter measures may be capable of removing from a device tracking data associated with or keyed by selected websites (or all websites identified) across multiple types or storage technologies. Thus, the device can be clear from any possible tracking data previously stored via the selected websites.

In one embodiment, counter measures against usage tracking may be capable of privacy enhancement. For example, a counter measure may include blocking selected websites from accessing local data (e.g. including application specific cache, such as browser cache) in a device to prevent usage tracking by the selected websites. Alternatively or optionally, the counter measure may actively update data settings (e.g. opt out) in a device for a particular website to instruct the particular website not to perform further usage tracking activities on the device.

In certain embodiments, multiple levels (or options) of privacy enhancements may be specified for different counter measures. For example, one level of privacy enhancement against a website may cause an application, such as a browser, to operate in a private mode for loading resources from the website. The application may enter the private mode to disable access to local storage in a device such that no data can be stored or retrieved for usage tracking. A higher level of privacy enhancement against a website may block access (e.g. network connection) to the website to cut off usage tracking activities from the website.

FIG. 1 is a block diagram illustrating one embodiment of network systems with unified tracking data management according to one embodiment described herein. Networked systems 100 may include one or more servers 105, e.g. based on web servers, coupled to one or more clients, such as client

109, via networks 107, which may include wired/wireless networks, Internet, intranet/extranet or other combinations of networks.

Servers 105 may host one or more websites storing resources addressable via network 107. Client 109 may retrieve a resource from servers 105 via a request with an address addressing the resource following a protocol such as HTTP (hypertext transport protocol). In one embodiment, each resource in servers 105 may be associated with a unique address, e.g. a URL (universal resource locator) based address, including a hostname. Typically, a hostname may be a domain name or label assigned to a host computer (or device) as a combination of the host's local name with its parent domain's name. For example, a URL "a.b.com" may consist of a local hostname "a" and a domain name "b.com". Multiple resources may be addressed under a common domain. Illustratively, two resources addressed by "http://hl.com/a.htm" and "http//hl.com/b.htm" may be of a common domain "hl.com". A website may represent a domain. In one embodiment, servers 105 may store resources from multiple domains including domain_1 101 and domain_2 103. Each resource may include text data (e.g. hypertext document, web page etc.), binary data (e.g. images, sound files, video, or other media content etc.), binary executables (e.g. dynamic link libraries), or other applicable data.

Client 109 may be a browser application or other applications running in a client device to perform transactions with servers 105. For example, client 109 may load resources (e.g. web pages or content) from servers 105 via the transactions. In one embodiment, client 109 may access data stores 111 as a result of loading resources from servers 105 and/or performing transactions with servers 105. Data stores 111 may be based on memory (e.g. DRAM device) or locally coupled mass storage device (e.g. hard drive, flash memory or other applicable storage devices). In one embodiment, client 109 may send data associated with (or keyed by) a domain_1 101 from data stores 111 when performing transactions with servers 105 to retrieve a resource addressed with domain_1 101. Alternatively, client 109 may store data (e.g. usage tracking data) for domain_1 101 as a result of loading a resource of domain_1 101 retrieved from servers 105.

Figure 2:
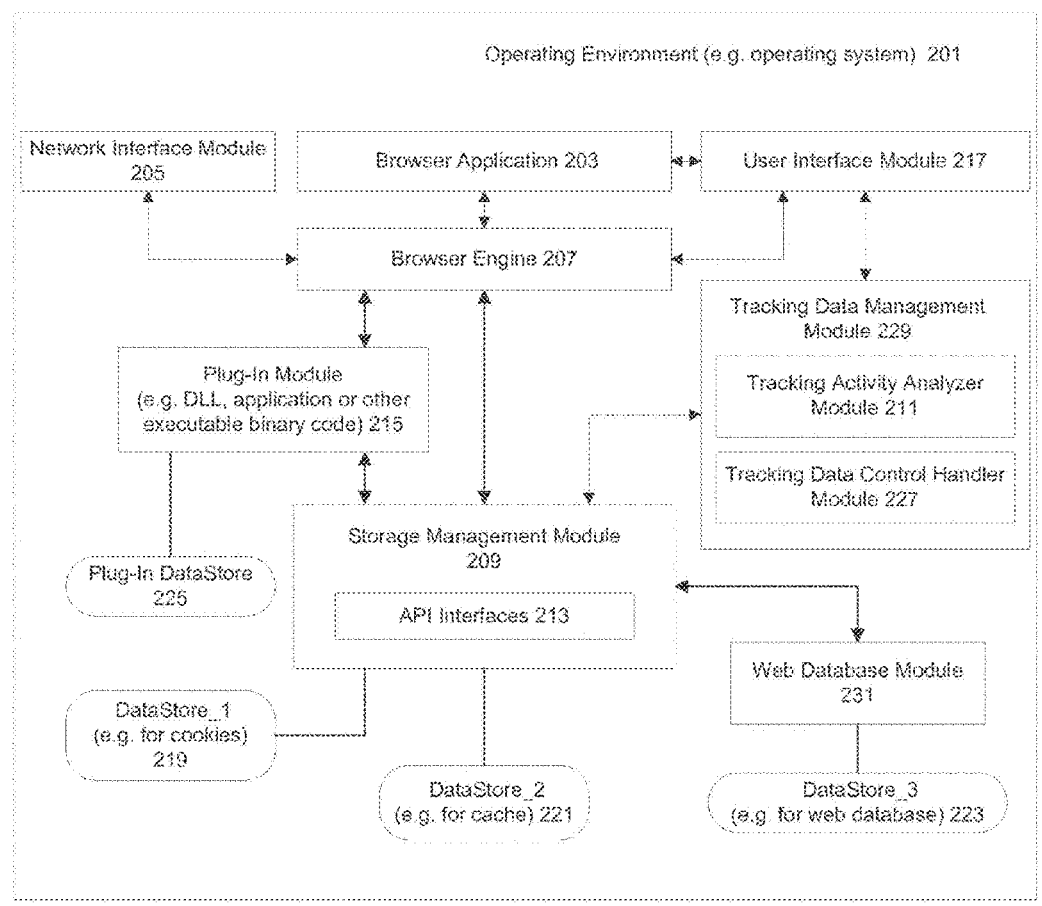
FIG. 2 is a block diagram illustrating an exemplary system for unified tracking data management.

FIG. 2 is a block diagram illustrating an exemplary system for unified tracking data management according to one embodiment described herein. In one embodiment, system 200 may be based on a client device, e.g. including client 109 of FIG. 1, running an operating environment 201. System 201 may include a browser application 203 which may be a standard browser application, e.g. Safari from Apple Inc. of Cupertino, Calif., Internet Explorer from Microsoft of Redmond, Wash., or other applicable browsers, capable of retrieving and rendering web content (e.g. a resource hosted in servers 105 of FIG. 1) based on standard specifications, such as HTML, HTTP, or other applicable specifications.

In one embodiment, system 200 may include a browser engine 207 capable of accessing local data storage, such as data stores 111 of FIG. 1, for remote domains, such as domain_1 101 and domain_2 103 of FIG. 1. Browser engine 207 may access (e.g. read, write, update etc.) local data storage via storage management module 209, for example, to store usage tracking data for a domain. Local data storage may include multiple data stores, such as datastore_1 219, datastore_2 221, datastore_3 223, plug-in datastore 225, or other applicable data stores accessible to browser engine 207. Each data store may store a separate type of data requiring a separate data interface mechanism. There may be an unbounded number of possible data stores or data types to store local data in a client device. A website may perform discovery transactions with the client device to dynamically discover or identify which types of data stores are available or supported in the client device.

In one embodiment, storage management module 209 may include data interface mechanisms to access each available data store for browser engine 207. For example, storage management module 209 may directly access datastore_1 219, datastore_2 221 and/or datastore_3 223. Access to datastore_1 219 may be based on web cookie specifications of Request For Comments 2965, "Http State Management Mechanism", October, 2000, to set or get cookie data as a piece of text. Access to datastore_2 221 may be based on web caching mechanism for storing, sharing and/or reusing copies of documents retrieved from web servers, such as resources hosted in servers 105 of FIG. 1, via network interface module 205. A same origin privacy policy may be implemented within storage management module 209 to prohibit a website (or a domain) from accessing data stored (or keyed, indexed) via a different domain.

Storage management module 209 may include API (application programming interface) interfaces 213 for accessing data stores, such as datastore_3 223 or plug-in datastore 225, indirectly via supported APIs. Separate API interfaces may be invoked to access different data stores. For example, Web Database Module 231 may support interface to datastore_3 223 based on APIs for web SQL database as specified in W3C working group note, Nov. 18, 2010. In one embodiment, storage management module 209 may access plug-in datastore 225 via plug-in module 215. A plug-in module (or plug-in, plugin) may be a set of software components (e.g. dynamically linked libraries (DLL) or other executable binaries) that add specific capabilities to a larger software application, such as browser application 203. For example, browser application 203 may support plug-ins to enable customizing browser functionality to play video (e.g. Flash Player from Adobe Inc. or QuickTime from Apple Inc., Java from Oracle Inc., Silverlight from Microsoft Inc., etc.), scan for viruses, display new file types, or perform other applicable functions. The set of plug-in modules installed or loaded in system 201 may change dynamically, depending on, for example, configurations of browser application 203 or versions of browser engine 207.

In one embodiment, browser application 203, e.g. a common standard browser such as Safari from Apple Inc., Internet Explorer from Microsoft Inc., etc. may receive user requests via user interface module 217 to access a web page or retrieve a resource addressed by a unique identifier, such as a URL. For example, a user request may be based on a URL address entered (e.g. in an address field) or a link selected (e.g. when the user clicks on a hyperlink, a bookmark link, or a history link) on a user interface of browser application 203. In response, browser application 203 may forward the request for the resource to browser engine 207 for loading and/or rendering the requested resource, for example, via network interface 205 or via local cache, such as datastore_2 221 to reuse previously fetched copy of the resource, for example, to reduce unnecessary network bandwidth usage.

In some embodiments, while loading a resource, browser engine 207 may automatically fetch additional resources in a manner unaware to a user of browser application 203. For example, browser engine 207 may load a hypertext document, such as an HTML (Hypertext Markup Language) document, addressed by a first address to render a web page requested by the user. The hypertext document may include a link to a resource with a second address, e.g. based on source attribute of a frame element for another HTML document, an image element for an image file, or other applicable hypertext elements. Browser engine 207 may load the resource of the second address automatically or recursively load other resources linked before completing loading the first resource. In one embodiment, browser engine 207 may record (or store) a parent child relationship between domains of the first and second addresses for managing tracking data associated with these domains.

In one embodiment, a parent domain may be a first party domain and a child domain may be a third party domain. A first party domain, for example, may correspond to a domain or subdomain presented in an address bar of browser application 203. Data (e.g. cookies or other tracking data) stored via resources of a first party domain may be first party data. In some embodiments, a domain associated with a web page may be a third party domain if the domain is different from a first party domain indicated in an address bar for the web page. Data stored during loading a resource of a third party domain (or third party resource) may be third party data.

Access to local data, such data stored in datastore_1 219, datastore_2 221, datastore_3 223, plug-in datastore 225, may be initiated via access to a resource in browser engine 207. For example, browser engine 207 may retrieve, via storage management module 209, data keyed by a domain of an address of a resource for a transaction (e.g. request/response) to receive the resource of the domain. As a result, the server of the domain may access local data, for example, via HTTP cookie get/set operations, associated with the domain from client system 200. Typically, browser engine 207 may prohibit a domain to access local data keyed (or indexed) by other domains.

Alternatively, browser engine 207 may perform operations specified in a resource of a domain to access (e.g. read/write) local data for the domain. For example, an HTML resource of the domain may include script code (e.g. JavaScript code or other script code) for reading or writing usage tracking data for the domain. Browser engine 207, when loading the HTML resource, may invoke a corresponding script engine, such as JavaScript engine or other script engines, to execute the script code to update data for the domain via storage management module 209. Resources from a domain may cause browser engine 207 to perform operations to hide usage tracking data, such as storing multiple copies data items in separate data stores for the domain or resurrecting (or duplicating) information stored in one data store to other data stores for the domain.

In some embodiments, a resource may include instructions to invoke a plug in extension, such as plug-in module 215 which may access its own data store, such as plug-in datastore 225 to update data for the domain of the resource. Browser engine 207 and/or plug-in modules may perform operations as specified in a resource of a domain to conduct transactions with a remote server of the domain, e.g. via network interface module 205, to access local stores for usage tracking. Thus, a user may browse a web page of one domain, e.g. via browser application 203, resources of additional domains linked directly or indirectly from the web page may be loaded to store and access usage tracking data for these domains in the background unknown to the user.

In one embodiment, tracking data management module 229 may be capable of providing a unified user interface via user interface module 217 to allow a user to manage usage tracking associated with various domains. Tracking activity analyzer module 211 may automatically enumerate each data store available in a device via storage management module 209 to identify each domain storing local data in system 200. For example, tracking data management module 211 may locate a set of currently installed plug-in modules and/or data stores associated with, for example, storage management module 209 or browser application 203, within system 200. Alternatively, tracking data management module 229 may send a request to storage management module 209 to identify exhaustively each directly or indirectly (e.g. via API interfaces) accessible data store.

In one embodiment, tracking data management module 211 may collect descriptions on data stored in each data store grouped according to domains. The descriptions may indicate, for example, size, time stamps, associated parent child linking relationship of the domain with other domains and/or other applicable attributes etc. API interfaces 213 may allow tracking data management modules 211 to indirectly query a plug-in data store, such as plug-in datastore 225, for the descriptions of data stored for the domain. In one embodiment, tracking activity analyzer 211 may analyze a variety of statistics from the collected descriptions for data stored in multiple data stores for the domain, such as frequency, number of times the domain have been embedded in web pages as a child domain (or third party domain), number of times a web page of the domain embedding other domains as child domains (or third party domains), or other applicable statistics or values. These statistics may be capable of indicating degrees of tracking from the corresponding domain.

In one embodiment, tracking data management module 229 may present domains sorted in an order based on degrees of usage tracking in a user interface, for example, via user interface module 217. Optionally, multiple sorting criteria, (e.g. each criteria corresponding to one statistics or attribute of data stored for a domain) may be available for a user to customize presentation of domains tracking usage data. Each domain presented may be associated with at least one data item keyed or indexed by the domain in a data store within system 201. As a result, summary information on usage tracking may be made available to the user. The summary information may include, for example, which domains may have been tracking usage of the user, how hard each domain has made tracking attempts (e.g. how much data, how many different types of data, etc.), or other applicable summary data, etc.

Tracking data management module 229 may provide a user interface to allow a user to invoke counter measures via tracking data control handler module 227 for reducing or eliminating usage tracking against exposed domains and/or future unknown domains. For example, in response to a user request selecting one or more domains, tracking data control handler module 227 may notify (or indirectly via storage management module 209) each data store within system 201, such as datastore_1, datastore_2, . . . plug-in datastore 225, to remove data items associated with the selected domains according to a counter measure. Alternatively, tracking data control handler module 227 may update storage management module 209 to prevent the selected domains from accessing local data storage (e.g. each data store or selected data stores) under certain conditions. For example, accessing (e.g. to reading/writing/inserting) local data storage may be prohibited from a selected domain when loading a resource of a domain different from the selected domain. Other applicable counter measures may be applicable.

Figure 3:
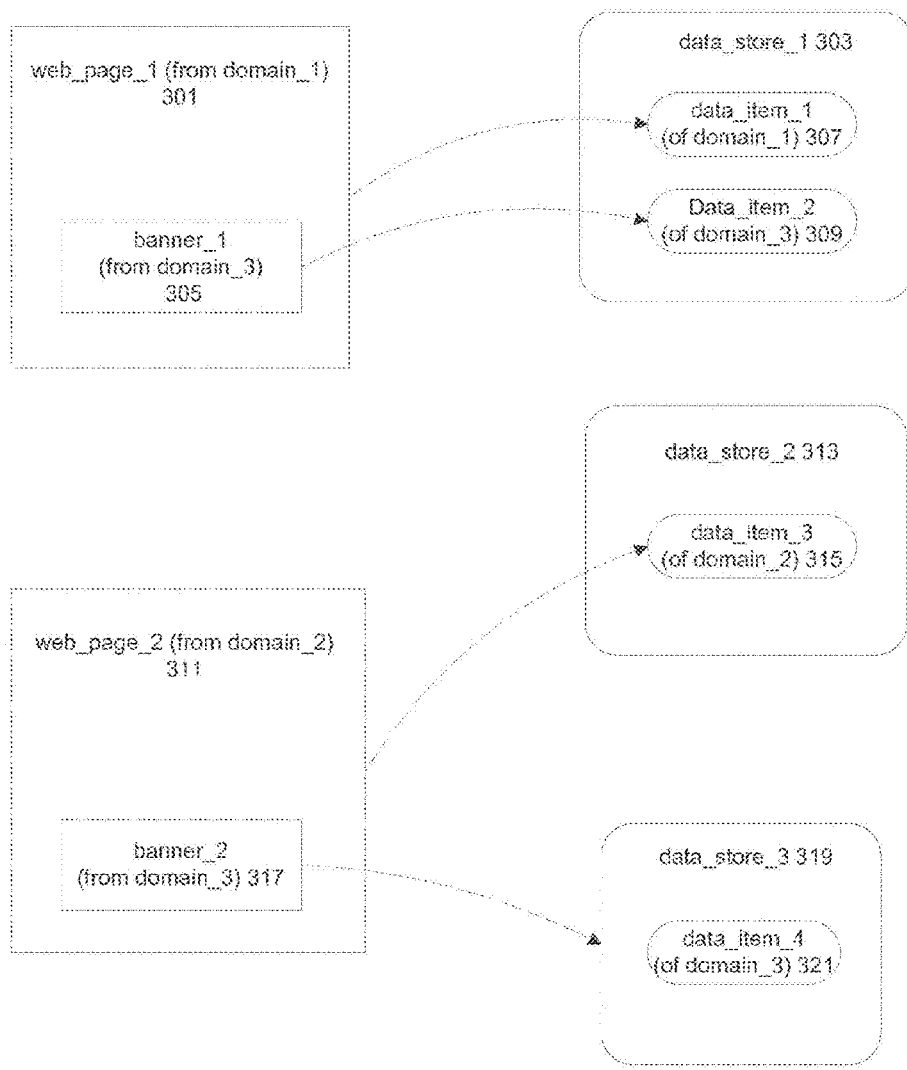
FIG. 3 illustrates an example of tracking data in multiple data stores via web resources.

FIG. 3 illustrates an example of tracking data in multiple data stores via web resources according to one embodiment described herein. Example 300 may be based on a client system, such as system 200 of FIG. 2. In one embodiment, web_page_1 301 may represent an HTML document from domain_1. Web_page_1 301 may embed banner_1 305, for example, as a hyperlink to an image resource from domain_3 different from domain_1. Data_item_1 307 may be stored in data_store_1 303 indexed by domain_1 as a result of loading web_page_1 301. Data_item_2 309 indexed by domain_3 may be of the same type of data stored in data_store_1 303 as a result of loading banner_1 305 from domain_3. In one embodiment, domain_1 may allow domain_3 to store data_item_2 309 according to a parent child (or embedding) relationship between domain_1 and domain_3.

Separately, web_page_2 311 may embed banner_2 317, for example, as a hyperlink to a multimedia resource from domain_3. Data_item_3 315 may be stored in data_store_2 313 indexed by domain_2 as a result of loading web_page_2 311. Data_item_4 321 indexed by domain_3 may be stored in data_store_3 319 as a result of loading banner_2 317 from domain_3. Each data store, such as data_store_1 303, data_store_2 313 or data_store_3 319 may store different types of data items keyed by associated domains. In one embodiment, a user may explicitly request loading of web_page_1 301 and web_page_2 311. In contrast, loading of banner_1 305 and banner_2 317 may be hidden from the user.

In some embodiments, loading of banner_2 317 of domain_3 may initiate usage data collection for domain_3. For example, data items keyed under domain_3 in a client device may be collected from each data store, such as data_store_1 303, data_store_2 313 and data_store_3 319. The collected data may be forwarded to a server of domain_3 for usage tracking purpose. Alternatively, data_item_4 321 of domain_3 may be generated according to data_item_2 309 of domain_3 for usage tracking update. In one embodiment, data_item_2 309 and data_item_4 321 may eventually be sent to domain_3 when loading other advertisement contents from domain_3 or visiting their websites of domain_3. Thus, domain_3 may then build up usage tracking data or compile a profile on the user across different websites or domains embedding domain_3 (or domain_3 has footprints on).

Figure 4:
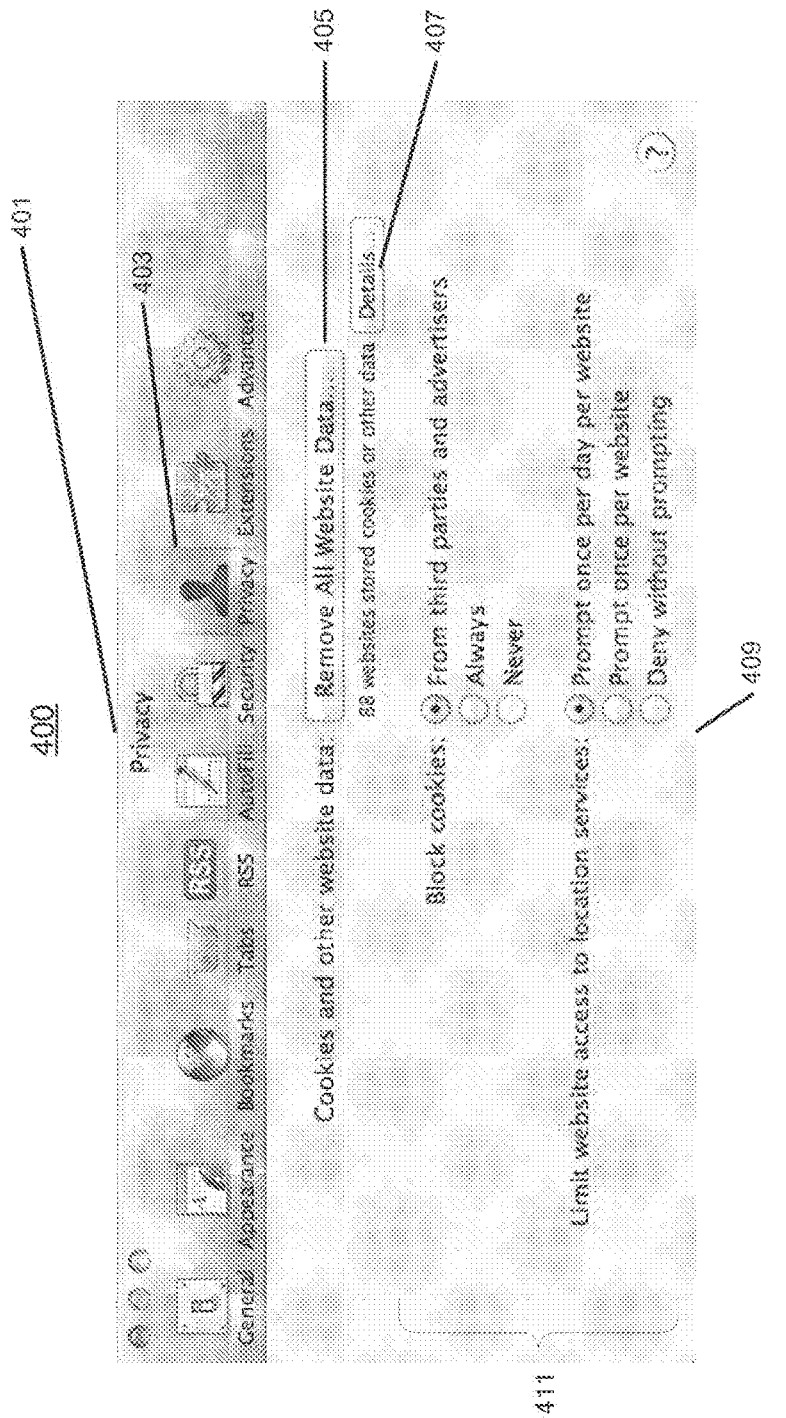
FIGS. 4-5 are sample diagrams illustrating examples of unified management of usage tracking data.
Figure 5:
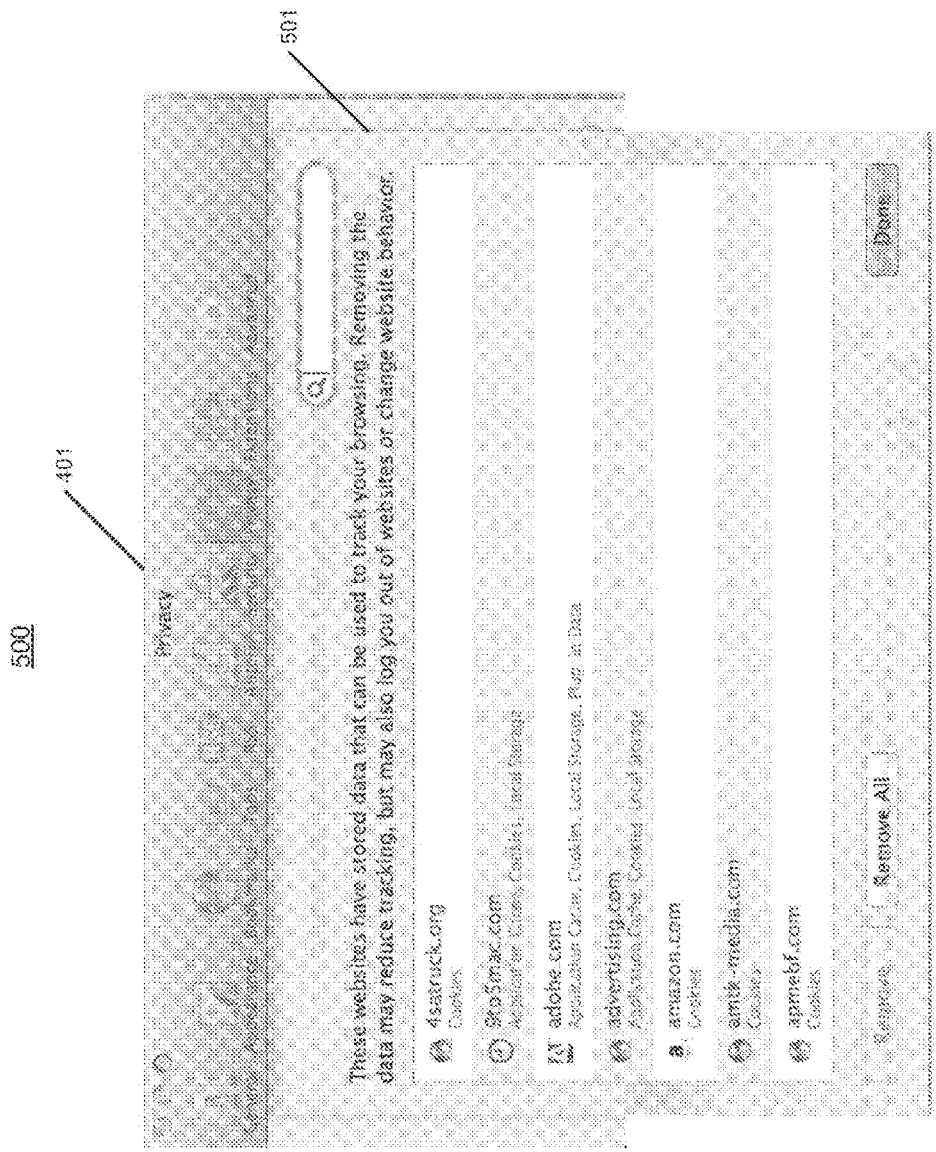

FIGS. 4-5 are sample diagrams illustrating examples of unified management of usage tracking data according to one embodiment described herein. For example, diagrams (e.g., user interfaces) 400 and 500 may be presented according system 200 of FIG. 2. In one embodiment, diagram 400 may illustrate a tool bar 401 including a privacy button 403 presented for a browser application, such as browser application 203 of FIG. 2. In one embodiment, in response to a user request via privacy button 403, each data store (e.g. cookie, local stores, cache, plug-in data, HTML5 database, or other applicable data store etc.) may be asked to reveal a list of all the websites having data stored in the data store. The lists may be merged across multiple data stores for different websites. A variety of counts (e.g. total number of websites, types of data etc.) may be performed to generate tracking data information for presentation.

In one embodiment, window 409 may include information and options for a user to manage usage tracking in a unified manner. For example, listing 407 may indicate a statistics on how many parties (e.g. 88 websites or domains) have been exposed to store data locally in a device. Possible counter measures may be presented as configuration options 411. Action button 405 may be provided to remove all local data stored in the device. Additionally, listing 407 may include a button for user to access more detailed information on evidences of data tracking collected from local storage of the device.

Turning now to FIG. 5, window 501 may present details of data tracking information identified from a client device, for example, corresponding to a response associated with an action button, such as Details button 407 of FIG. 4. In one embodiment, window 501 may include a list of websites or domains sorted according a degree of usage tracking or other criteria (e.g. alphabetical order). Each website may be accompanied by tracking information such as types of data stored. Additionally, diagram 500 may include user interface elements for a user to select particular websites, search certain websites (e.g. name or tracking activities), or taking counter measures against usage tracking. For example, a user may be allowed to select a counter measure to remove tracking data associated with selected websites or all websites. Accordingly, each data store may be instructed to remove data associated with the selected websites or be emptied completely.

Figure 6:
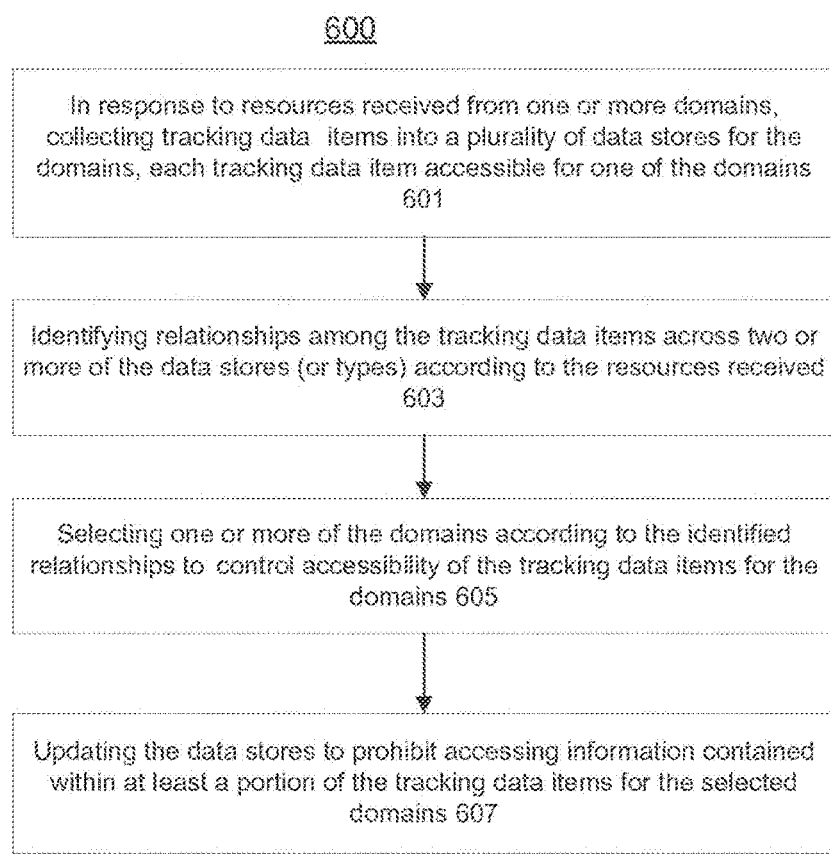
FIG. 6 is a flow diagram illustrating one embodiment of a process to identify relationships of tracking data across multiple data stores for managing access to the tracking data.

FIG. 6 is a flow diagram illustrating one embodiment of a process to identify relationships of tracking data across multiple data stores for managing access to the tracking data according to one embodiment describe herein. Exemplary process 600 may be performed by a processing logic that may comprise hardware (circuitry, dedicated logic, etc.), software (such as is run on a dedicated machine), or a combination of both. For example, process 600 may be performed by some components of system 200 of FIG. 2. At block 601, the processing logic of process 600 can collect tracking data items into one or more data stores for a domain or website in response to resources received from the domain. Each data store may store a different type of data items indexed by associated domains. Each data item may be accessible for its associated domain and/or, optionally, hidden from other domains.

At block 603, the processing logic of process 600 may identify relationships among the tracking data items across multiple data stores (or types of data). For example, a record may indicate a parent child relationship between a parent domain and a child domain (e.g. as a third party domain) according to a first resource (or a document corresponding to a web page) of the parent domain. The first resource may include a link to automatically retrieving a second resource of a child domain without waiting for a user request.

In one embodiment, at block 605, the processing logic of process 600 may select one or more domains to control accessibility of tracking data items stored for the selected domains. For example, the processing logic of process 600 may determine a degree of usage tracking for a domain according to how many resources have embedded hyperlinks of the domain as a type of third party domain. The processing logic of process 600 may update data stores to prohibit accessing information contained within at least a portion of the tracking data items associated with the selected domains.

Figure 7:
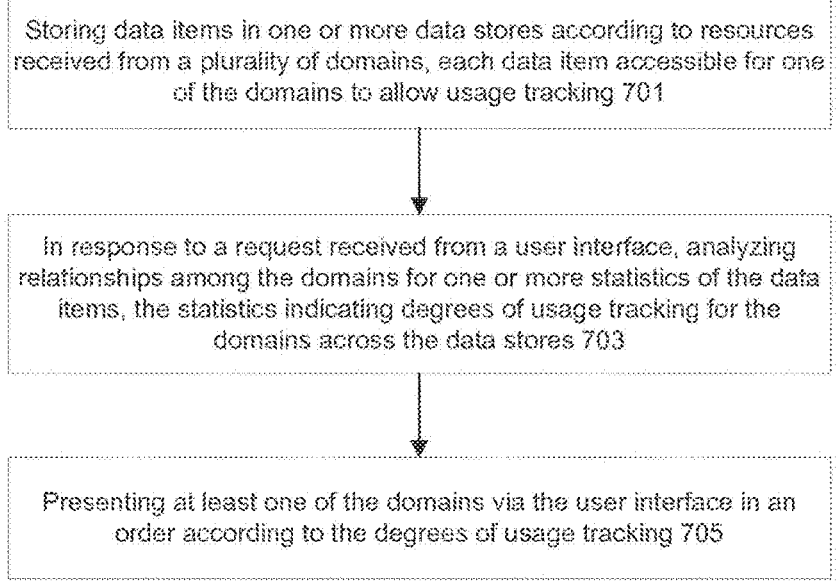
FIG. 7 is a flow diagram illustrating one embodiment of a process to present domains (or web sites) with degrees of usage tracking across multiple data stores.

FIG. 7 is a flow diagram illustrating one embodiment of a process to present domains (or websites) with degrees of usage tracking across multiple data stores according to one embodiment describe herein. Exemplary process 700 may be performed by a processing logic that may comprise hardware (circuitry, dedicated logic, etc.), software (such as is run on a dedicated machine), or a combination of both. For example, process 700 may be performed by some components of system 200 of FIG. 2. At block 701, the processing logic of process 700 can store data items in data stores for usage tracking according to resources, such as hypertext documents or script code, received from a plurality of domains. Each data item may be indexed by a domain and accessible to the domain while not accessible to other domains.

At block 703, in response to a request received from a user interface, the processing logic of process 700 may analyze relationships among domains having data items stored in data stores. For example, the analysis may determine a third party domain related to (or allowed by) a first party domain. In one embodiment, the processing logic of process 700 may identify or derive one or more statistics from the data items. The statistics may include, for example, a total count of third party domains allowed by one particular first party domain, a total count of first party domains allowing a particular third party domain, or other applicable measures. The statistics may indicate degrees of usage tracking for each domain across the data stores.

Subsequently, at block 705, the processing logic of process 700 may present at least one of the domains via a user interface to expose usage tracking activities to a user. In some embodiments, the processing logic of process 700 may sort domains in an order according to the degrees of usage tracking. Alternatively, the user may be allowed to select different criteria, such as statistics of third party domains, to explore various sorting orders among the domains presented.

Figure 8:
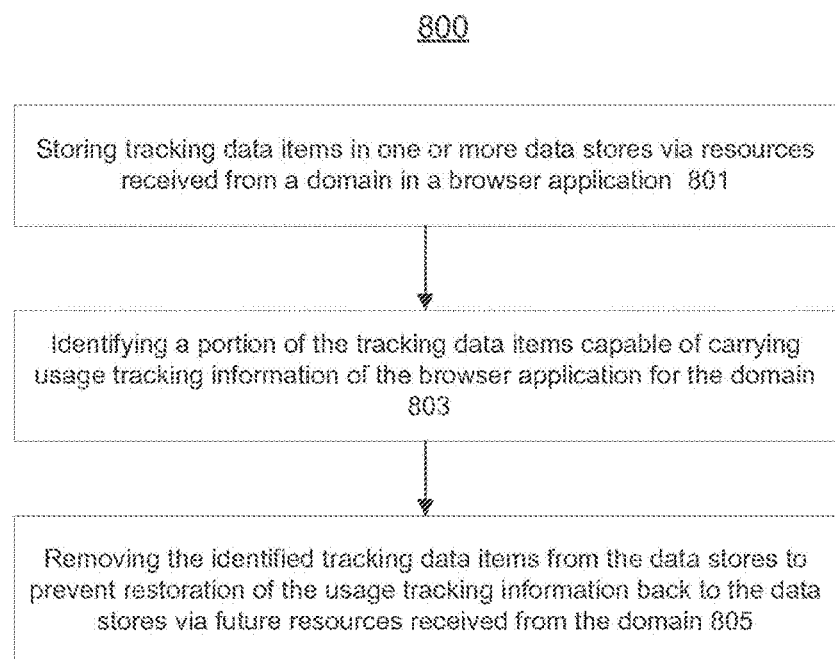
FIG. 8 is a flow diagram illustrating one embodiment of a process to update data stores to prevent restoring removed usage tracking information back to the data stores.

FIG. 8 is a flow diagram illustrating one embodiment of a process to update data stores to prevent restoring removed usage tracking information back to the data stores according to one embodiment describe herein. Exemplary process 800 may be performed by a processing logic that may comprise hardware (circuitry, dedicated logic, etc.), software (such as is run on a dedicated machine), or a combination of both. For example, process 800 may be performed by some components of system 200 of FIG. 2. At block 801, the processing logic of process 800 can store tracking data for a domain in separate data stores in a device via a browser application. For example, the tracking data may be stored as a result of the browser application loading the resources.

At block 803, in one embodiment, the processing logic of process 800 may identify a portion of the tracking data capable of carrying usage tracking information, for example, via a browser application, for the domain. The processing logic of process 800 may recognize option settings, such as turning usage tracking on/off, within locally stored data items for a particular domain to control usage tracking. In one embodiment, data items may be identified as potential tracking data if not recognizable according to configured options settings. At block 805, the processing logic of process 800 may remove identified tracking data items for a domain from each available data store within a device. As a result, the processing logic of process 800 may prevent restoration of removed usage tracking information for a domain from other data stores back to its original data store (or a separate data store) when loading resources from the domain in the future.

FIG. 9 is a flow diagram illustrating one embodiment of a process to present summary statistics on tracking data to manage degrees of tracking in a unified manner according to one embodiment describe herein. Exemplary process 900 may be performed by a processing logic that may comprise hardware (circuitry, dedicated logic, etc.), software (such as is run on a dedicated machine), or a combination of both. For example, process 900 may be performed by some components of system 200 of FIG. 2. At block 901, the processing logic of process 900 can collect descriptions of tracking data stored in each local data store in a device in response to receiving a user input via a user interface, such as a preference button for a browser application. Each data store may store a separate type of tracking data. The descriptions may identify which websites (or domains) storing tracking data in each data store.

At block 903, the processing logic of process 900 may merge collected descriptions of data items across multiple data stores. The merged descriptions may include summary statistics indicating a degree of data tracking on a device for separate domains. In one embodiment, summary statistics for a domain may be based on counting data items keyed by a common domain across different data stores. At block 905, the processing logic of process 900 may present the summary statistics of data tracking to a user of a device. The processing logic of process 900 may provide options to allow the user to select counter measures to reduce the degree of data tracking on the device in a unified manner without requiring the user to separately manage different data stores and/or domains. The user may select which counter measures to activate via the presented options. In response, at block 907, the processing logic of process 900 may update the data stores for the selected counter measures to reduce the degree of data tracking or to prevent future data tracking on the device.

Figure 10:
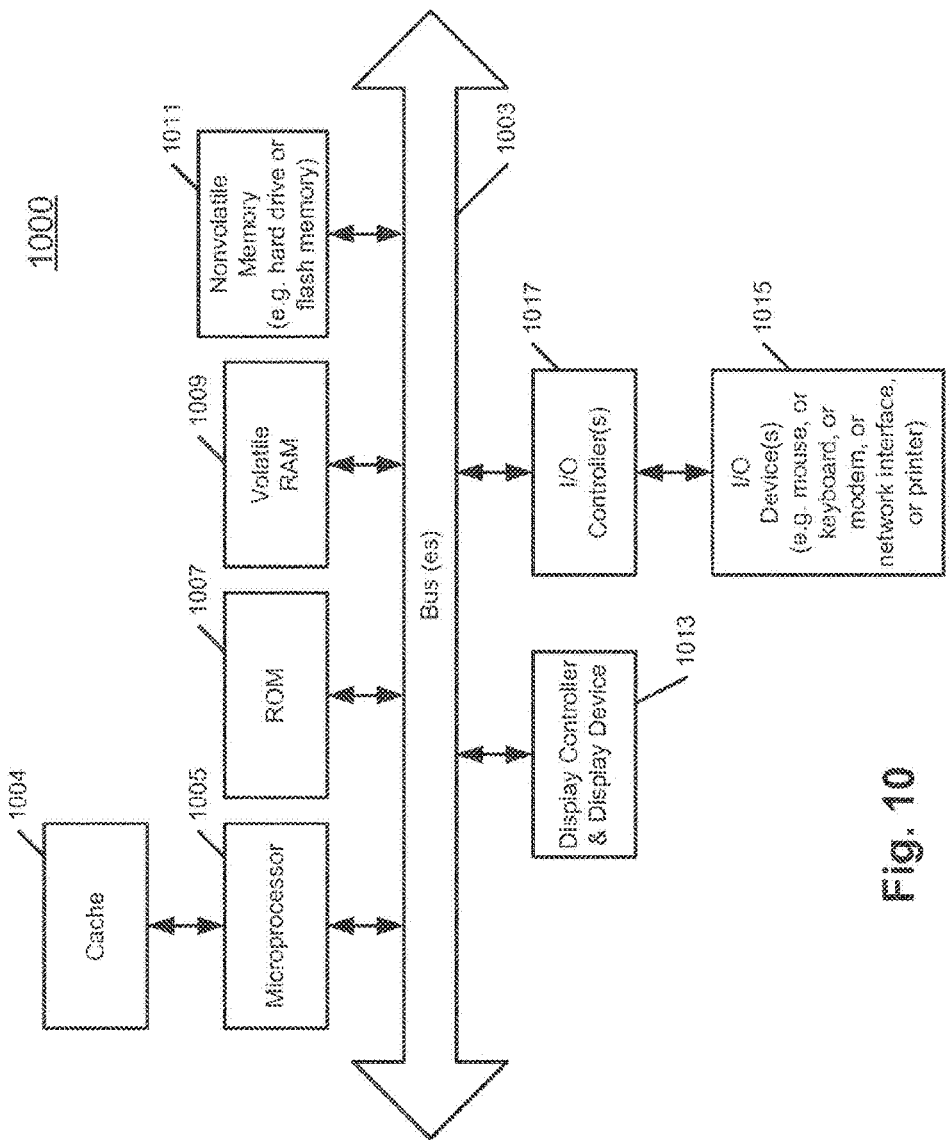
FIG. 10 illustrates one example of a data processing system such as a computer system, which may be used in conjunction with the embodiments described herein.

FIG. 10 shows one example of a data processing system such as a computer system, which may be used with one embodiment in the present invention. For example, the system 1000 may be implemented as a part of the system shown in FIG. 1. Note that while FIG. 10 illustrates various components of a computer system, it is not intended to represent any particular architecture or manner of interconnecting the components as such details are not germane to the present invention. It will also be appreciated that network computers and other data processing systems which have fewer components or perhaps more components may also be used with the present invention.

As shown in FIG. 10, the computer system 1000, which is a form of a data processing system, includes a bus 1003 which is coupled to a microprocessor(s) 1005 and a ROM (Read Only Memory) 1007 and volatile RAM 1009 and a non-volatile memory 1011. The microprocessor 1005 may retrieve the instructions from the memories 1007, 1009, 1011 and execute the instructions to perform operations described above. The bus 1003 interconnects these various components together and also interconnects these components 1005, 1007, 1009, and 1011 to a display controller and display device 1013 and to peripheral devices such as input/output (I/O) devices which may be mice, keyboards, modems, network interfaces, printers and other devices which are well known in the art. Typically, the input/output devices 1015 are coupled to the system through input/output controllers 1017. The volatile RAM (Random Access Memory) 1009 is typically implemented as dynamic RAM (DRAM) which requires power continually in order to refresh or maintain the data in the memory.

The mass storage 1011 is typically a magnetic hard drive or a magnetic optical drive or an optical drive or a DVD RAM or a flash memory or other types of memory systems which maintain data (e.g. large amounts of data) even after power is removed from the system. Typically, the mass storage 1011 will also be a random access memory although this is not required. While FIG. 10 shows that the mass storage 1011 is a local device coupled directly to the rest of the components in the data processing system, it will be appreciated that the present invention may utilize a non-volatile memory which is remote from the system, such as a network storage device which is coupled to the data processing system through a network interface such as a modem or Ethernet interface or wireless networking interface. The bus 1003 may include one or more buses connected to each other through various bridges, controllers and/or adapters as is well known in the art.

Portions of what was described above may be implemented with logic circuitry such as a dedicated logic circuit or with a microcontroller or other form of processing core that executes program code instructions. Thus processes taught by the discussion above may be performed with program code such as machine-executable instructions that cause a machine that executes these instructions to perform certain functions. In this context, a "machine" may be a machine that converts intermediate form (or "abstract") instructions into processor specific instructions (e.g. an abstract execution environment such as a "virtual machine" (e.g. a Java Virtual Machine), an interpreter, a Common Language Runtime, a high-level language virtual machine, etc.), and/or, electronic circuitry disposed on a semiconductor chip (e.g. "logic circuitry" implemented with transistors) designed to execute instructions such as a general-purpose processor and/or a special-purpose processor. Processes taught by the discussion above may also be performed by (in the alternative to a machine or in combination with a machine) electronic circuitry designed to perform the processes (or a portion thereof) without the execution of program code.

An article of manufacture may be used to store program code. An article of manufacture that stores program code may be embodied as, but is not limited to, one or more memories (e.g. one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g. a server) to a requesting computer (e.g. a client) by way of data signals embodied in a propagation medium (e.g. via a communication link (e.g. a network connection)).

The preceding detailed descriptions are presented in terms of algorithms and symbolic representations of operations on data bits within a computer memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations described herein. This apparatus may be specially constructed for the required purpose, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), RAMs, EPROMs, EEPROMs, magnetic or optical cards, or any type of media suitable for storing electronic instructions, and each coupled to a computer system bus.

The processes and displays presented herein are not inherently related to any particular computer or other apparatus. Various general-purpose systems may be used with programs in accordance with the teachings herein, or it may prove convenient to construct a more specialized apparatus to perform the operations described. The required structure for a variety of these systems will be evident from the description below. In addition, the present invention is not described with reference to any particular programming language. It will be appreciated that a variety of programming languages may be used to implement the teachings of the invention as described herein.

The foregoing discussion merely describes some exemplary embodiments of the present invention. One skilled in the art will readily recognize from such discussion, the accompanying drawings and the claims that various modifications can be made without departing from the spirit and scope of the invention.

What is claimed is:

1. A method, comprising:
   at a computing device with a display and one or more input devices:
      displaying, on the display, a tracking data user interface that includes concurrently displayed representations corresponding to a plurality of websites that have been visited by the computing device and are associated with tracking data stored on the computing device for the plurality of websites, the concurrently displayed representations including:
         a first representation corresponding to a first web site of the plurality of websites that is associated with one or more types of tracking data stored on the computing device for the first website; and
         a second representation corresponding to a second website of the plurality of websites, different from the first website, that is associated with one or more types of tracking data stored on the computing device for the second website;
      while displaying, on the display, the representations corresponding to the plurality of websites, receiving from a user, via the one or more input devices, a request to remove at least a portion of the tracking data stored on the computing device for the plurality of web sites; and
      in response to receiving from the user, via the one or more input devices, the request to remove at least the portion of the tracking data stored on the computing device for the plurality of websites:
         in accordance with a determination that the request includes selection of a respective website of the plurality of websites, removing tracking data stored on the computing device that is associated with the respective website while maintaining tracking data stored on the computing device that is associated with one or more other websites in the plurality of web sites.

2. The method of claim 1, further comprising, in response to receiving from the user, via the one or more input devices, the request:
in accordance with a determination that the request includes a request to remove tracking data stored on the computing device from all of the websites in the plurality of websites, removing tracking data stored on the computing device from all of the websites in the plurality of websites.

3. The method of claim 1, further comprising providing a search field in the tracking data user interface for searching through the tracking data stored on the computing device.

4. The method of claim 1, wherein removing the tracking data stored on the computing device that is associated with the respective website includes removing a plurality of different types of tracking data stored on the computing device that is associated with the respective website.

5. The method of claim 1, including removing a plurality of different types of tracking data stored on the computing device that is associated with a plurality of different websites.

6. The method of claim 1, further comprising, in response to the received request, preventing the respective website from performing usage tracking activities.

7. The method of claim 1, wherein the first representation corresponding to the first website includes an indication that the first respective website is associated with a plurality of types of tracking data stored on the computing device.

8. A device, comprising:
one or more data processors;
a display;
one or more input devices; and
one or more non-transitory computer-readable storage media containing instructions configured to cause the device to perform operations including:
displaying, on the display, a tracking data user interface that includes concurrently displayed representations corresponding to a plurality of websites that have been visited by the computing device and are associated with tracking data stored on the computing device for the plurality of websites, the concurrently displayed representations including:
a first representation corresponding to a first website of the plurality of websites that is associated with one or more types of tracking data stored on the computing device for the first website; and
a second representation corresponding to a second website of the plurality of websites, different from the first website, that is associated with one or more types of tracking data stored on the computing device for the second website;
while displaying, on the display, the representations corresponding to the plurality of websites, receiving from a user, via the one or more input devices, a request to remove at least a portion of the tracking data stored on the computing device for the plurality of web sites; and
in response to receiving from the user, via the one or more input devices, the request to remove at least the portion of the tracking data stored on the computing device for the plurality of websites:
in accordance with a determination that the request includes selection of a respective website of the plurality of websites, removing tracking data stored on the computing device that is associated with the respective website while maintaining tracking data stored on the computing device that is associated with one or more other websites in the plurality of websites.

9. The device of claim 8, wherein the instructions contained in the one or more non-transitory computer-readable storage media include instructions configured to cause the device to perform operations including:
in response to receiving from the user, via the one or more input devices, the request:
in accordance with a determination that the request includes a request to remove tracking data stored on the computing device from all of the websites in the plurality of websites, removing tracking data stored on the computing device from all of the websites in the plurality of websites.

10. The device of claim 8, wherein the instructions contained in the one or more non-transitory computer-readable storage media include instructions configured to cause the device to perform operations including: providing a search field in the tracking data user interface for searching through the tracking data stored on the computing device.

11. The device of claim 8, wherein removing the tracking data stored on the computing device that is associated with the respective website includes removing a plurality of different types of tracking data stored on the computing device that is associated with the respective website.

12. The device of claim 8, wherein the instructions contained in the one or more non-transitory computer-readable storage media include instructions configured to cause the device to perform operations including: removing a plurality of different types of tracking data stored on the computing device that is associated with a plurality of different websites.

13. The device of claim 8, wherein the instructions contained in the one or more non-transitory computer-readable storage media include instructions configured to cause the device to perform operations including: in response to the received request, preventing the respective website from performing usage tracking activities.

14. The device of claim 8, wherein the first representation corresponding to the first website includes an indication that the first respective website is associated with a plurality of types of tracking data stored on the computing device.

15. A non-transitory computer readable storage medium containing instructions configured to cause a device, having a display and one or more input devices, to perform operations including:
displaying, on the display, a tracking data user interface that includes concurrently displayed representations corresponding to a plurality of websites that have been visited by the computing device and are associated with tracking data stored on the computing device for the plurality of websites, the concurrently displayed representations including:
a first representation corresponding to a first website of the plurality of websites that is associated with one or more types of tracking data stored on the computing device for the first website; and
a second representation corresponding to a second website of the plurality of websites, different from the first website, that is associated with one or more types of tracking data stored on the computing device for the second website;

while displaying, on the display, the representations corresponding to the plurality of websites, receiving from a user, via the one or more input devices, a request to remove at least a portion of the tracking data stored on the computing device for the plurality of websites; and in response to receiving from the user, via the one or more input devices, the request to remove at least the portion of the tracking data stored on the computing device for the plurality of websites:

in accordance with a determination that the request includes selection of a respective website of the plurality of websites, removing tracking data stored on the computing device that is associated with the respective website while maintaining tracking data stored on the computing device that is associated with one or more other websites in the plurality of websites.

16. The non-transitory computer readable storage medium of claim 15, wherein the instructions contained in the non-transitory computer-readable storage medium include instructions configured to cause the device to perform operations including:

in response to receiving from the user, via the one or more input devices, the request:

in accordance with a determination that the request includes a request to remove tracking data stored on the computing device from all of the websites in the plurality of websites, removing tracking data stored on the computing device from all of the websites in the plurality of websites.

17. The non-transitory computer readable storage medium of claim 15, wherein the instructions contained in the non-transitory computer-readable storage medium include instructions configured to cause the device to perform operations including:

providing a search field in the tracking data user interface for searching through the tracking data stored on the computing device.

18. The non-transitory computer readable storage medium of claim 15, wherein removing the tracking data stored on the computing device that is associated with the respective website includes removing a plurality of different types of tracking data stored on the computing device that is associated with the respective website.

19. The non-transitory computer readable storage medium of claim 15, wherein the instructions contained in the non-transitory computer-readable storage medium include instructions configured to cause the device to perform operations including: removing a plurality of different types of tracking data stored on the computing device that is associated with a plurality of different websites.

20. The non-transitory computer readable storage medium of claim 15, wherein the instructions contained in the non-transitory computer-readable storage medium include instructions configured to cause the device to perform operations including:

in response to the received request, preventing the respective website from performing usage tracking activities.

21. The non-transitory computer readable storage medium of claim 15, wherein the first representation corresponding to the first website includes an indication that the first respective website is associated with a plurality of types of tracking data stored on the computing device.

* * * * *